United States Patent [19]

Van Nes et al.

[11] Patent Number: 4,864,623
[45] Date of Patent: Sep. 5, 1989

[54] METHOD OF RECOGNIZING A CONTROL COMMAND IN A SYSTEM, AND INTERACTIVE SYSTEM FOR CARRYING OUT THE METHOD

[75] Inventors: Floris L. Van Nes; Fredrick F. Leopold, both of Eindhoven; Frederik J. Schäffers, Hilversum, all of Netherlands

[73] Assignee: U.S. Philips Corporation, New York, N.Y.

[21] Appl. No.: 741,058

[22] Filed: Jun. 5, 1985

[30] Foreign Application Priority Data

Jun. 13, 1984 [NL] Netherlands ............... 8401862

[51] Int. Cl.$^4$ ............................................. G10L 7/08
[52] U.S. Cl. ................................... 381/43; 381/110
[58] Field of Search ............................ 381/41–46, 381/110; 364/513.5; 369/24–25, 47, 50; 367/198; 379/88–89; 360/69, 71

[56] References Cited

U.S. PATENT DOCUMENTS

| | | | |
|---|---|---|---|
| 3,535,464 | 10/1970 | Deinzer et al. | 369/50 |
| 3,647,985 | 3/1972 | Langendorf et al. | 369/50 |
| 3,946,157 | 3/1976 | Dreyfus | 381/43 |
| 4,000,517 | 12/1976 | Brickerd | 369/50 |
| 4,125,865 | 11/1978 | Mohammadioun | 360/69 |
| 4,239,936 | 12/1980 | Sakoe | 381/43 |
| 4,371,752 | 2/1983 | Matthews et al. | 379/89 |
| 4,462,080 | 7/1984 | Johnstone et al. | 364/513.5 |
| 4,509,133 | 4/1985 | Monbaron et al. | 381/43 |
| 4,641,342 | 2/1987 | Watanabe et al. | 381/43 |
| 4,698,776 | 10/1987 | Shibata | 364/513.5 |

OTHER PUBLICATIONS

Conrad, "Giving Phone Systems a Voice", Telecommunications, Apr. 1984, pp. 122-126.
Jones, "Building-Block Circuits Simplify Integration on Voice Input Systems", Computer Technology Review, Jan. 1983, pp. 63-67.
Martin, "One Way to Talk to Computers", IEEE Spectrum, May 1977, pp. 35-39.
Boies et al., "User Interface for Audio Communication System", IBM Technical Disclosure Bull., vol. 25, No. 7A, 12/82, pp. 3371-3377.

Primary Examiner—Gary V. Harkcom
Assistant Examiner—John A. Merecki
Attorney, Agent, or Firm—Bernard Franzblau

[57] ABSTRACT

In a method of recognizing a control command in a system, in which a message from a user of the system is presented to the system in the form of speech and is recorded on a record carrier (11) by the system, and in which the control commands are presented to the system in the form of spoken commands, the speech is detected by a speech detector (15) during recording of the message. If no speech is detected for a specific time interval (T), recording is discontinued and a speech command recognizer (14) is rendered operative to recognize a control command to be presented to the system by the user.

8 Claims, 2 Drawing Sheets

METHOD OF RECOGNIZING A CONTROL COMMAND IN A SYSTEM, AND INTERACTIVE SYSTEM FOR CARRYING OUT THE METHOD

BACKGROUND OF THE INVENTION

This invention relates to a method of recognizing a control command in a system, for example a voice-mail system, in which a message from a user of the system, presented to the system in the form of speech, is recorded on a record carrier by the system.

The invention also relates to a system for carrying out the method. A method of the type specified in the opening paragraph is disclosed in the European Patent Application No. 29.938, laid open to Public inspection. In the known method the control commands are applied to the system by pressing the keys of a telephone set. For this it is necessary that the dialing information from the keys be sent over the telephone lines by means of tone combinations (for example the "dual-tone multifrequency" system).

SUMMARY OF THE INVENTION

The known method has the disadvantage that it is not possible to present the control commands to the system in the form of speech. It is an object of the invention to provide a method and a system which enable the control commands to be presented to the system in the form of speech. To this end the method in accordance with the invention is characterized in that the control commands are presented to the system in the form of speech and, during recording of the message, the speech is detected for a specific time interval, recording is discontinued and the command recognizer is switched on to recognize a control command to be presented to the system by the user. The invention is based on the recognition of the fact that if the control commands are presented to the system in the form of speech, special steps should be taken to distinguish between the spoken control commands and the speech message spoken by the user. For example, during recording of the message on the record carrier the user may decide that the message recorded so far is not correct and should be erased. The user now only has to remain silent for the said time interval. The command recognizer is than switched on and the user may present a control command to the system. It is obvious that the time interval should be longer than the normal speech pauses in a spoken message in order to prevent the command recognizer from being switched on inadvertently.

The method may be characterized further in that after recording has been discontinued, the system gives the user an indication that the command recognizer is switched on or will be switched on. This ensures that the user (in particular an untrained user) knows that he has waited long enough and that the command recognizer will be or is switched on, so that he may present a control command to the system.

A system for carrying out the inventive method, comprises:
- a first unit comprising a record carrier for recording a message from a user on the record carrier,
- a command recognizer for recognizing control commands presented to the system by the user, and
- a second unit coupled to the first unit for switching on and switching off the first unit.

The invention is characterized in that the system comprises a speech detector and the second unit is coupled to the speech detector and to the command recognizer and is adapted to switch off the first unit and to switch on the command recognizer if the speech detector detects no speech for a specific time interval while the first unit is switched on. This system enables the method in accordance with the invention to be realized in a comparatively simple way.

Another system for carrying out the method, in which the user is given an indication that the command recognizer is or will be switched on, comprises:
- a first unit comprising a record carrier for recording a message from a user on the record carrier,
- a command recognizer for recognizing control commands presented to the system by the user,
- a second unit, coupled to the first unit, for switching on and switching off the first unit, and
- a third unit for presenting information to the user, wherein the second unit is also coupled to the third unit for switching on and switching off the third unit.

This embodiment of the invention is characterized in that the system comprises a speech detector and the second unit is coupled to the speech detector and to the command recognizer and is adapted to switch off the first unit and to switch on the third unit to provide an indication to the user that the command recognizer is switched on or will be switched on, and to switch on the command recognizer if the speech detector has detected no speech for a specific time interval while the first unit is switched on.

It is to be noted that in the foregoing and hereinafter the expression "switching on or switching of" of, for example, the command recognizer is to be understood to mean switching on or switching off the function of the command recognizer. This may mean, for example, that a switch in the connection between an audio input terminal and the input of the command recognizer is closed or opened or that the power supply to the recognizer is switched on or off.

BRIEF DESCRIPTION OF THE DRAWINGS

The invention will now be described in more detail, by way of example, with reference to the accompanying drawings. In the drawings.

DESCRIPTION OF THE PREFERRED EMBODIMENTS

Figure 1:
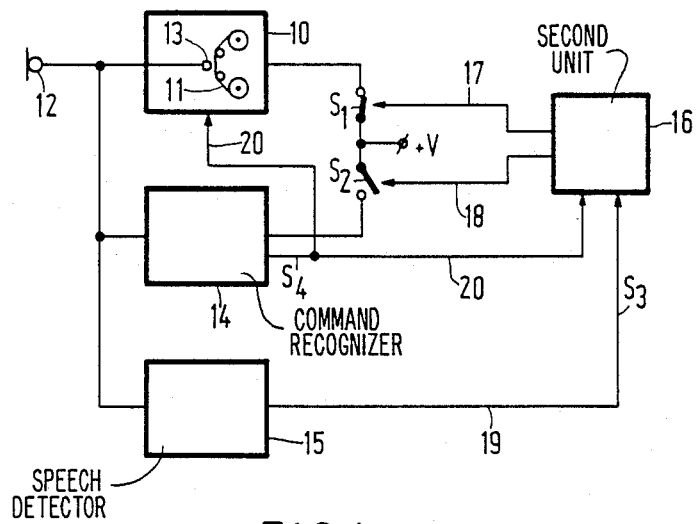
FIG. 1 shows a system embodying the method.

The system of FIG. 1 comprises a first unit 10 with a record carrier 11 for recording a message from a user of the system on the record carrier 11. For this purpose the system comprises a microphone 12 which is electrically coupled to a recording head 13. In the present case the record carrier is a magnetic tape. However, other record carriers, for example digital memories, may also be used for this purpose.

The system further comprises a command recognizer 14, a speech detector 15, and a second unit 16. Via the line 17 the second unit 16 is coupled to the first unit 10 for switching on and switching off the first unit. This is achieved in that the second unit 16 controls a switch $S_1$, arranged in the power supply line from + V to the first unit 10, via the line 17. Via the line 18 the second unit 16 is coupled to the command recognizer 14 for switching on and switching off the command recognizer. For this purpose the second unit controls a switch $S_2$ via the line 18, which switch is arranged in the power supply line from $+V$ to the command recognizer 14. Via a control line 19 the speech detector 15 is coupled to the second unit 16 and the command recognizer 14 is coupled to the first unit 10 and to the second unit 16 via a control line 20. Further, the microphone 12 is coupled to an input of the command recognizer 14 and the speech detector 15. The command recognizer and the speech detector may be any one of various known types of command recognizer and speech detector suitable for a particular field of use of the invention.

The operation of the system will now be described in more detail with reference to FIG. 2.

Figure 2:
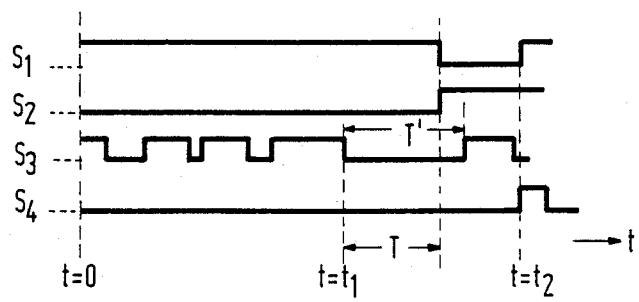
FIG. 2 shows some signals in the system of FIG. 1 as a function of time.

FIG. 2 shows four time signals $S_1$, $S_2$, $S_3$ and $S_4$. $S_1$ is the signal which is applied to the switch $S_1$ via the line 17 and $S_2$ is the signal which is applied to the switch $S_2$ is the signal which is applied to the switch $S_2$ via the line 18. At the instant $t=0$ the signal $S_1$ is "high". This means that the switch $S_1$ is closed. Consequently, the first unit 10 is switched on. At this instant the signal $S_2$ is "low", which means that the switch $S_2$ is open and the command recognizer 14 is switched off. Subsequently, a message from the user is applied to the first unit 10 via the microphone 12 and is recorded on the record carrier. The speech detector 15 detects the spoken message from the user. In FIG. 2 this can be seen in that $S_3$ is "high" at the instant $t=0$. Between $t=0$ and $t=t_1$ it can be sen that the signal $S_3$ is briefly "low" at specific instants, which correspond to the natural speech pauses. At the instant $t=t_1$ the user discovers, for example, that he has entered a wrong message. Since the command recognizer 14 is not operative, he cannot give a control command. In order to switch on the command recognizer the user remains silent for a specific sufficiently long time T'. From $t=t_1$ the signal $S_3$ goes "low".

The second unit 16, to which the signal $S_3$ is applied, will subsequently pull the signal $S_1$ "low" if the signal $S_3$ has remained "low" for a time interval T, so that the switch $S_1$ is opened, and will pull the signal $S_2$ "high" so that the switch $S_2$ is closed. Now the command recognizer 14 is switched on and can recognize a control command given by the user at the instant $t=t_1+T'$ (see $S_3$, which goes briefly "high" from this instant). At the instant $t=t_2$ the command recognizer initiates a control signal $S_4$ which is applied to the first unit and the second unit via the line 20, so that switch $S_1$ is closed and, for example, the incorrect message is erased.

Figure 3:
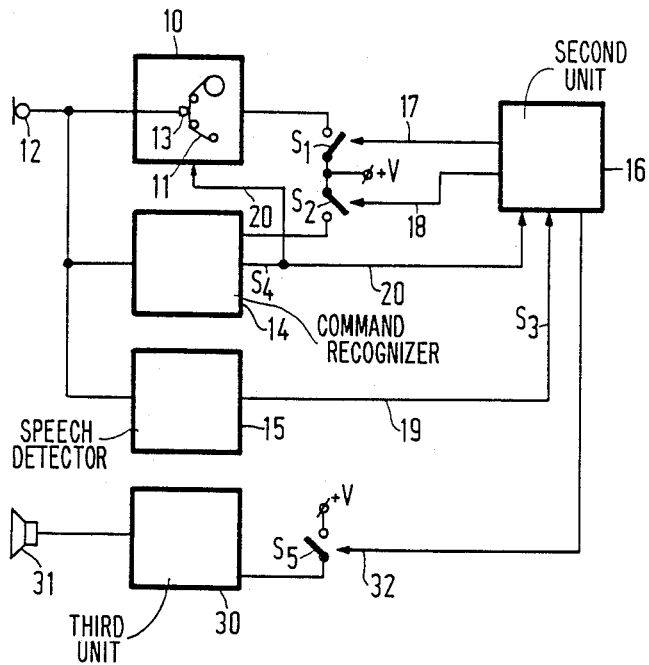
FIG. 3 shows another embodiment.

FIG. 3 shows a system in accordance with another embodiment of the invention. The system shown in FIG. 3 is an interactive system, which is identical to the system shown in FIG. 1 and which has been extended by a third unit 30 for presenting information to the user. This is done by means of the loudspeaker 31. For this purpose, the third unit 30 receives a control signal $S_5$ from the second unit 16 via the line 32, which signal controls the switch $S_5$ in the supply line from the third unit 30 to the power-supply terminal $+V$.

Figure 4:
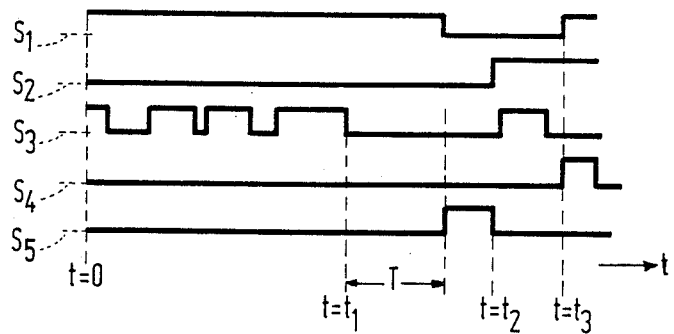
FIG. 4 shows some signals in the system of FIG. 3 as a function of time.

FIG. 4 shows the control signals $S_1$ to $S_5$ in the system of FIG. 3 as a function of time. Until the instant $t=t_1 +T$ the signals $S_1$ to $S_4$ in FIG. 4 are identical to those in FIG. 2. At the instant $t=t_1 + T$ the first unit is switched off again. Thus, recording is discontinued. At this instant the signal $S_5$ goes "high". This means that the switch $S_5$ in the supply line of the third unit 30 is closed. As a result of this, the third unit 30 is switched on. Via the loudspeaker 31 the third unit 30 now provides the indication that the command recognizer will be switched on. Such an indication may be for example:

"The command recognizer is now on" or
"You may give a control command".

As is apparent from signal $S_2$ in FIG. 4 this happens at the instant $t=t_2$. The user now gives a command (the signal $S_3$ is briefly "high" after $t=t_2$) and the command recognizer recognizes the command (the signal $S_4$ is briefly "high" from $t=t_3$).

The foregoing applies to the situation in which the system is used by a trained user who knows which commands may be given after the said indication from the system. In general, the untrained user will not know which commands may be given after the indication by the system. For this purpose, the method and the system may employ the idea described in the Netherlands Patent Application nr. 84 01 863 (PHN 11.060). Said application states that after the system has given the indication the command recognizer remains switched on for a specific maximum time interval. If no command is recognized within this time interval because the untrained user does not know which command to give and therefore remains silent, the command recognizer is first switched off and then the system provides information about the appropriate control commands. After this the command recognizer is switched on again and the user may give a command to the system. The trained user knows which commands to give and will immediately give a command within the time interval after the command recognizer has been switched on for the first time. If the command is recognized, the system does not furnish the information about the appropriate group of control commands, but immediately executes the recognized command. Thus, time is saved because the system need not give information about the appropriate group of control commands.

It is to be noted that various modifications of the present embodiments are possible within the scope of the invention as defined in the Claims. For example, the command recognizer may be adapted to recognize spoken control commands in the form of a numerical code instead of direct verbal control commands, such as "erase", "record", "play back" etc. Obviously, the last method of applying control commands is the simplest method for a (skilled or unskilled) user.

What is claimed is:

1. A method of recognizing a speech control command in a recording system, in which a speech message from a user of the system is recorded on a record carrier by the system, said method comprising, during recording of the speech message, detecting the speech message in a speech detector and, if no speech message is detected during recording for a specific time interval, discontinuing recording and switching on a speech command recognizer in the system to recognize a speech control command to be presented to the system by the user, and presenting said speech control command to the system subsequent to said specific time interval.

2. A method as claimed in claim 1, further comprising, indicating to the user, after recording has been discontinued, that the command recognizer is switched on or will be switched on.

3. A method as claimed in claim 1 wherein said recording system comprises a voice-mail system.

4. A voice input system with automatic recognition of a speech control command during presentation of a speech message to the system comprising:
 speech input means,
 a first unit coupled to said speech input means and comprising a record carrier for recording a speech message from a user of the system,
 a command recognizer coupled to the speech input means for recognizing speech control commands presented to the system by the user, said command recognizer being off during a speech message recording phase of the system,
 a second unit coupled to the first unit for switching on the first unit to initiate the speech message recording phase and for switching off the first unit,
 a speech detector coupled to the speech input means, and means for coupling the second unit to the speech detector and to the command recognizer, wherein, during said recording phase, the second unit is responsive to the speech detector to switch off the first unit and to switch on the command recognizer if the speech detector detects no speech message from said speech input means for a specific time interval during said recording phase.

5. A system as claimed in claim 3 wherein said speech input means comprises an acousto-electric converter and, a first input of the first unit, an input of the command recognizer and an input of the speech detector are coupled to an output of the acousto-electric converter, an output of the command recognizer is coupled to a second input of the first unit and to a first input of the second unit, an output of the speech detector is coupled to a second input of the second unit, and further comprising switching means controlled by the second unit for selectively coupling a source of operating voltage to the first unit and to the command recognizer under control of the second unit.

6. A voice input system with automatic recognition of a speech control command during presentation of a speech message to the system comprising:
 speech input means,
 a first unit coupled to said speech input means and comprising a record carrier for recording a speech message from a system user,
 a command recognizer coupled to the speech input means for recognizing a speech control command presented to the system by the user,
 a second unit coupled to the first unit for switching on the first unit to record a speech message on the record carrier and for switching off the first unit,
 a third unit for presenting an indication to the user as to the state of the command recognizer, means coupling the second unit to the third unit for switching the third unit on and off,
 a speech detector coupled to the speech input means, and means for coupling the second unit to the speech detector and to the command recognizer, and wherein the second unit is responsive to the speech detector to switch off the first unit to interrupt recording of the speech message, to switch on the third unit to provide an indication to the user that the command recognizer is or will be switched on, and to switch on the command recognizer if the speech detector has detected no speech message for a specific time interval while the first unit is switched on.

7. A method of recognizing a speech control command in a speech recording system having a speech detector and a speech command recognizer that is off during a recording phase of the system, said method comprising:
 recording on a record carrier a speech message presented to the system by a user thereof during said recording phase and, during recording of the speech message detecting the speech message in the speech detector and, if no speech message is detected for a specific time interval during the recording phase, automatically discontinuing the recording phase and automatically turning on the command recognizer of the system which then becomes responsive to a control command presented to the system by the user thereby to initiate a command phase of the system.

8. A method as claimed in claim 7, comprising the further step of presenting a speech control command to the system after the command recognizer is turned on.

* * * * *